No. 626,120.  
A. WINTON.  
EXPLOSIVE ENGINE.  
(Application filed June 4, 1896.)  
Patented May 30, 1899.

(No Model.)  
2 Sheets—Sheet 1.

Witnesses  
Geo. E. Frech  
James W. Bevans

Inventor  
Alexander Winton  
by Pattison & Nesbit  
Attorneys

No. 626,120. Patented May 30, 1899.
A. WINTON.
EXPLOSIVE ENGINE.
(Application filed June 4, 1896.)
(No Model.) 2 Sheets—Sheet 2.
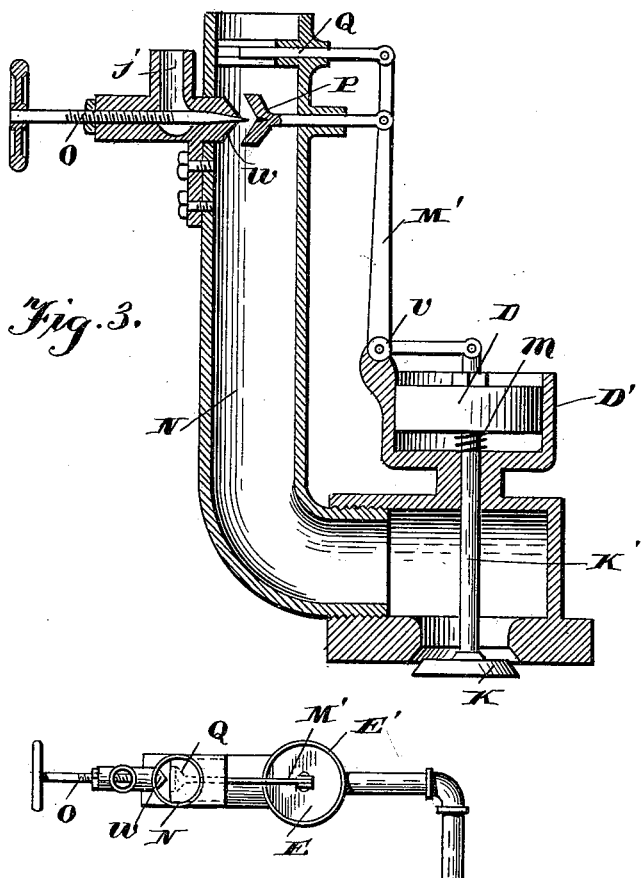
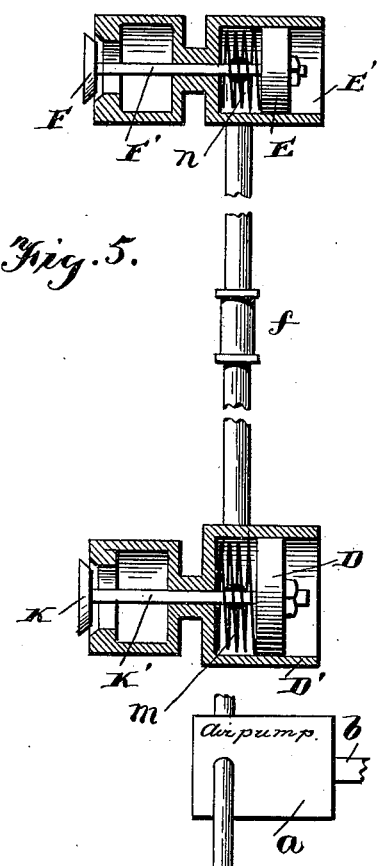
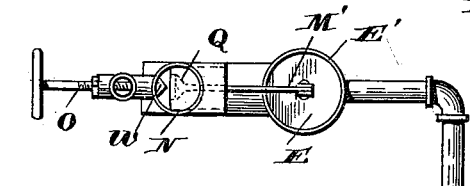
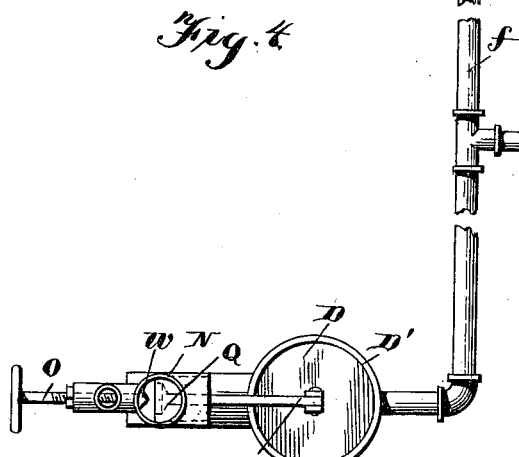
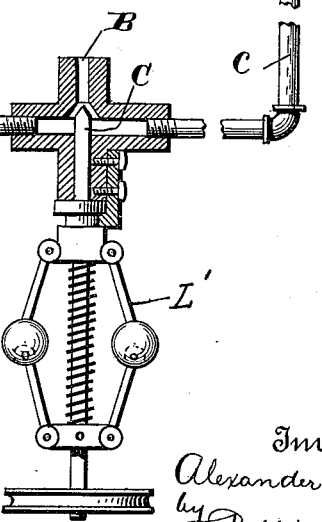
Witnesses
Geo. E. Frech.
James W. Bevans
Inventor
Alexander Winton
by Pattison & Nesbit
Attorney's
THE NORRIS PETERS CO., PHOTO-LITHO., WASHINGTON, D. C.

UNITED STATES PATENT OFFICE.

ALEXANDER WINTON, OF CLEVELAND, OHIO.

EXPLOSIVE-ENGINE.

SPECIFICATION forming part of Letters Patent No. 626,120, dated May 30, 1899.

Application filed June 4, 1896. Serial No. 594,316. (No model.)

*To all whom it may concern:*

Be it known that I, ALEXANDER WINTON, of Cleveland, in the county of Cuyahoga and State of Ohio, have invented certain new and useful Improvements in Explosive-Engines; and I do hereby declare the following to be a full, clear, and exact description of the invention, such as will enable others skilled in the art to which it pertains to make and use it, reference being had to the accompanying drawings, which form part of this specification.

My invention relates to improvements in explosive-engines, and pertains to an automatic governor for regulating the admission of air and gas and to automatic means for shutting off the flow of the hydrocarbon liquid except when the cylinder of engine is being charged.

One object of my present invention is to provide a very sensitive and reliable governor for regulating the amount of the explosive mixture which is permitted to pass into the cylinder, according to the speed of the engine, and hence according to the working resistance or load on the engine.

Another object of my invention is to provide means for shutting off completely the flow of hydrocarbon liquid except when the cylinder is being charged and to relatively regulate the amount of air and hydrocarbon fed at each charge, whereby the quality of the charge remains practically the same whether the charge be large or small.

This invention also pertains to a governor and hydrocarbon-feeding device for Four-cycle system explosive-engines, whereby the governor will regulate not only the amount of charge admitted to each cylinder and the quality thereof, but should the load of the engine be light it will control the charging-valves so that but one cylinder will be in operation.

Figure 1:
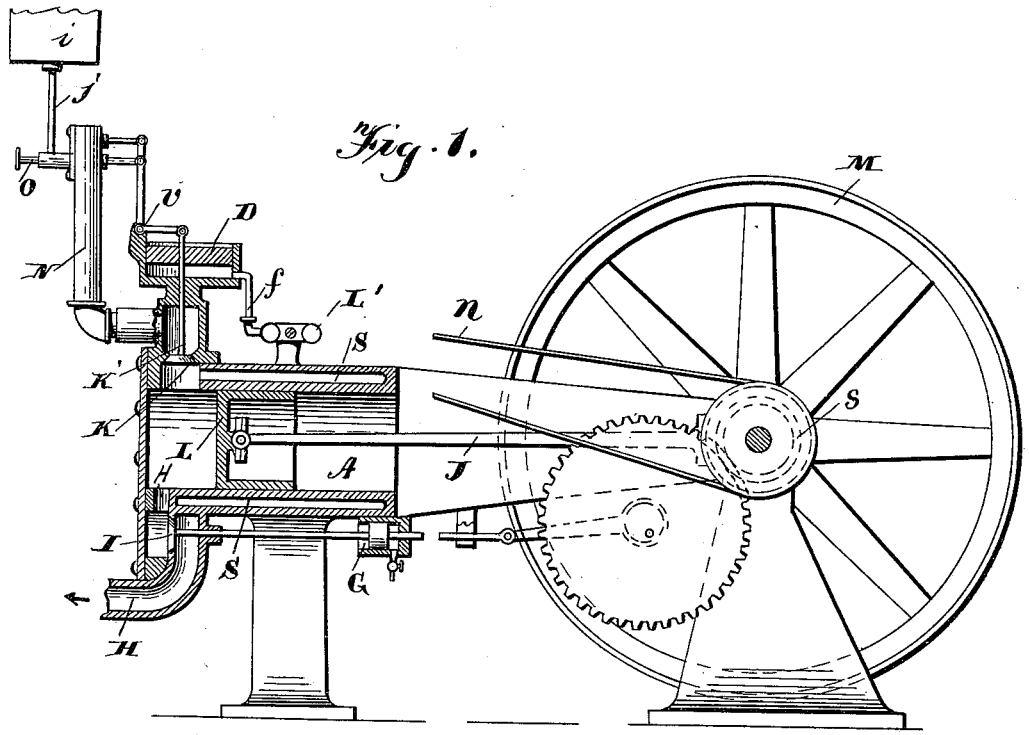
Figure 2:
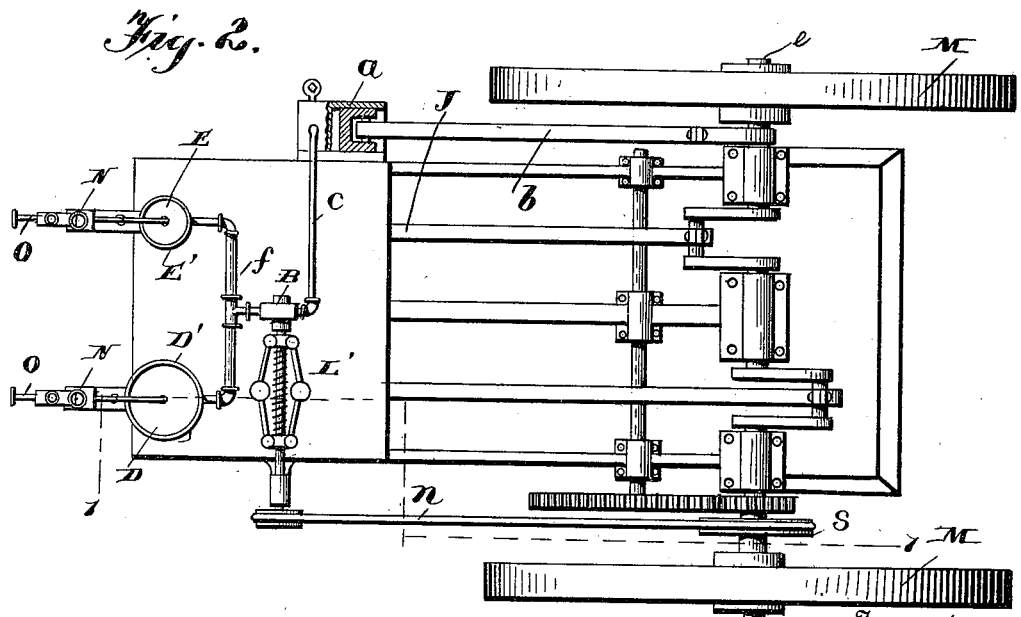

In the accompanying drawings, Figure 1 is a side view of an engine embodying my invention, the cylinder and charge-regulating valve being shown in section. Fig. 2 is a plan view showing the relative location of the parts embodying my invention. Fig. 3 is an enlarged sectional view of the charge-regulating valve and the carbon and air feed regulating devices. Fig. 4 is a plan view of my invention, the governor being shown in section. Fig. 5 is an enlarged sectional view of the pressure-actuated valve and member.

Referring now to the drawings, A is the cylinder, and S the ordinary water-jacket, J the pitman, L the piston, and M the balance wheels. The engine is of the ordinary Four-cycle Otto system and need have no minute description given thereof, but in which I is the exhaust-valve, and H the exhaust-port, and G the dash-pot or air-cushion to prevent hammering or noise in the receding of the exhaust-valve I.

One part of my invention relates to the regulating of the admission of the explosion mixture to the cylinder, and in which F and K are valves regulating ports for the two cylinders of the engine, respectively, each valve having a valve-stem F′ K′, connected with pistons E and D, situated in the piston-chambers E′ and D′, respectively. *a* is an air-pump actuated by the drive-shaft *e* of the engine through the medium of an eccentric-rod *b*, and the air-pump is in communication with the piston-chambers E′ D′ through the medium of a pipe *c*, connected with a pipe *f*, the latter uniting the two cylinders, as clearly shown in Figs. 2 and 4. The valves F and K are initially held to their seats by suitable coiled springs *m*, and mixing-pipes N are in communication with the charging-ports for conveying an explosion mixture therethrough to the cylinders. A ball-governor L′ of the usual type is connected with the pipe *c* and situated between the air-pump *a* and the piston-cylinders E′ D′ for the purpose of regulating the air-pressure within the cylinders E′ D′ beneath the pistons E and D, respectively. This governor is rotated by means of a belt *n*, passing around a pulley *s* upon the driving-shaft *e* in the usual manner, and the stem of the said governor has its end formed into a valve C, which controls the air-outlet B of the pipe *c*. The operation of this part of my invention is that when the engine is running at a normal speed there is a constant escape of air out the air-outlet B; but should the speed of the engine increase, the stem of the governor is forced endwise, causing the valve C to close the air-outlet B and cause a pressure upon the pistons E and D, respectively, and thereby control through said pressure the amount of explosive mixture admitted through the ports into the cylinders by holding the valves F and K near their seats and regulating thereby the amount of charge, as will readily be understood. Should any variation occur in the speed of the engine, the valve C instantly opens or closes, thus increasing or decreasing the pressure upon the pistons E and D, and thereby increasing and decreasing the amount of charge, and thus regulating the speed of the engine, as will be readily conceived. The governor just described is found to be very sensitive, and thus to enable me to regulate very accurately the speed of the engine according to the load thereon.

It will be noticed that the piston E is smaller than the piston D, the object of which is to cause one cylinder to be shut off entirely when the engine is running light. Owing to the increased area of the piston D it requires less air-pressure in its cylinder to hold its valve K tightly against its seat than the piston E, so that when the engine is running light the governor will so regulate the pressure, as will be readily understood, as to hold the valve K tight to its seat while permitting a charge through the port controlled by the valve F of the small cylinder E'.

The apparatus for regulating the mixing of the explosive fluid with the air consists in connecting the pistons E and D therewith in a manner to be now described, whereby the movement of the pistons will regulate the admission of air and liquid.

$i$ indicates hydrocarbon-reservoirs connected through the medium of pipes $j$ to the pipes N. A needle-valve O is interposed between the end of the pipe $j$ and the air or mixing pipe or tube N, whereby the amount of hydrocarbon fed to the mixing-tube N is readily regulated to a nicety. A bell-crank lever M' is pivotally connected at the point $v$ to the cylinders E' and D', respectively, the lower ends of the bell-crank levers being pivotally connected to the pistons E and D, respectively. A cap P is shaped to close the needle-valve opening or nozzle $w$ when forced inward, and the outer end of this cap P is loosely connected with the upper portion of the bell-crank lever M'. At a point above the cap P and within the mixing-tube N is a gate or valve Q, having its end also loosely connected with the upper extremity of the bell-crank lever M. From this description it will be readily seen that when the engine is being charged the pistons E and D are drawn downward and the cap P and gate Q moved away from their nozzles and hydrocarbon admitted, and also air admitted in the upper ends of the pipes N. When the valves F and K are closed, the pistons E and D moving upward force the caps in and shut off the flow of hydrocarbon and move the valve Q in to stop the flow of air. It is not necessary, however, that the flow of air be stopped, the main object being to permit a flow of hydrocarbon only when it is needed. The object of having the gate or valve Q is to regulate the amount of air admitted to the mixing-tube N in proportion to the amount of hydrocarbon admitted thereto, whereby the quality of the fluid admitted to the cylinders of the engine is always the same no matter whether the charge be large or small, as will be readily understood.

By means of mechanisms as above described I am enabled to accurately and reliably regulate the speed of the engine and to prevent any flooding of hydrocarbon and to cause at all times practically the same quality of explosive fluid to be generated and fed to the cylinders of the engine.

Having thus described my invention, what I claim, and desire to secure by Letters Patent, is—

1. In an explosive-engine, the combination of an explosive-inlet port, a valve therefor actuated in one direction by the suction of the engine-piston, a pressure-actuated member acting against said piston action and operatively connected with the valve, a pressure-producing device in communication with said pressure-actuated member, a pressure-escape, and a governor controlling said pressure-escape, substantially as described.

2. In an explosive-engine, the combination of an explosive-inlet port, a valve controlling said port, a pressure-actuated member controlling said valve, a pressure-producing device in communication with said pressure-actuated member, a pressure-escape in communication with one side of said pressure-actuated member, and out of communication with the other side of said member, and a governor for said escape, substantially as described.

3. The combination in an engine having a plurality of cylinders provided with inlet-ports, valves controlling said ports, pistons or diaphragms controlling the valves, the area of one piston being greater than the area of the other piston, and a pressure-producing device in communication with the pistons or diaphragms, substantially as described.

4. In an explosive-engine, the combination of a plurality of cylinders having explosive-inlet ports, valves controlling the same, diaphragms or pistons controlling the valves, one diaphragm or piston having a greater area than the other, a pressure-producing device in communication with the said pistons or diaphragms, and a governor situated between the pressure-producing device and the said pistons or diaphragms, substantially as described.

5. The combination in an explosive-engine, of the cylinder having an explosive-inlet port, a valve controlling said port, a controller for the valve, a fluid-feeder in communication with said port, and a fluid-controller operatively connected with the valve-controller, substantially as described.

6. The combination with an explosive-engine, the cylinder having an explosive-inlet port, a mixing-tube in communication therewith, a fluid-feeder in communication with the mixing-tube, a controller therefor, a controller for the said explosive-inlet-port valve, an air-regulating valve for the said mixing-tube, and an operative connection between the valve-controller and the fluid and air controllers, substantially as described.

7. The combination in an explosive-engine of the cylinder having an explosive-inlet port, a mixer in communication therewith, a fluid-feeder in communication with the mixer, an air-regulating device for the said mixer, a controller for the said valve, and a connection between the air-regulator and the valve-controller, substantially as described.

8. The combination with an explosive-engine cylinder having an explosive-inlet port, a valve adapted to control the same, a mixer in communication with the said port, a controller for the valve, a bell-crank lever having one end connected with the controller, a fluid-feeder in communication with the mixer, a controller for the fluid-feeder, the said controller being connected with the opposite end of the bell-crank lever, substantially as described.

9. The combination in an explosive-engine, of the cylinder having an explosive-inlet port, a valve adapted to control the same, a mixer in communication with the said port a controller for the valve, a bell-crank lever having one end connected with the controller, a fluid-feeder in communication with the mixer, the controller for the fluid-feeder, an air-controller for the mixer, the fluid-controller and the air-controller being connected with the opposite end of the bell-crank-lever, substantially as described.

10. In an explosive-engine, the combination of the cylinder having an explosive-inlet port, the valve controlling the same, a mixer in communication with the port, a controller for the valve, a fluid-feeder in communication with the mixer, a controller for the fluid-feeder, and a lever connection between the fluid-controller and the valve-controller whereby when the valve-controller is moved the fluid-controller is likewise moved and operated, substantially as described.

11. The combination with an explosive-engine having a plurality of cylinders with explosive-inlet ports, valves for controlling the ports, a pressure-actuated member for each valve, a pressure-producing device in communication with the pressure-actuated member, the pressure-actuated members having different working capacities for the purpose described.

12. The combination with an explosive-engine having a plurality of cylinders with explosive-inlet ports, valves for controlling the ports, a pressure-actuated member for each valve, a pressure-producing device in communication with the pressure-actuated members, the pressure-actuated members working upon their valves with different degrees of force, substantially as and for the purpose described.

13. The combination in an explosive-engine, of an explosive-inlet port, a valve therefor, a pressure-producing device, a pressure-actuated member controlling said valve, a communication between said pressure-producing device and said pressure-actuated member, an external escape for the pressure, and a governor controlling said escape, substantially as described.

14. In an explosive-engine, a plurality of cylinders, inlet-ports therefor, valves controlling said ports, a pressure-actuated member for each valve, a pressure-producing device having communication with all said pressure-actuated members, and a single pressure-escape controlling the pressure upon all of said pressure-actuated members, substantially as described.

In testimony whereof I affix my signature in presence of two witnesses.

ALEXANDER WINTON.

Witnesses:
L. A. REED,
N. H. BOARDMAN.